(12) United States Patent
Kean et al.

(10) Patent No.: US 10,286,403 B2
(45) Date of Patent: May 14, 2019

(54) PROCESS FOR RECOVERING SCRAP FIBER

(71) Applicants: Tod M. Kean, Chandler, AZ (US); James H. Kean, Boulder, CO (US)

(72) Inventors: Tod M. Kean, Chandler, AZ (US); James H. Kean, Boulder, CO (US)

( * ) Notice: Subject to any disclaimer, the term of this patent is extended or adjusted under 35 U.S.C. 154(b) by 714 days.

(21) Appl. No.: 14/890,213

(22) PCT Filed: May 15, 2014

(86) PCT No.: PCT/US2014/038054
§ 371 (c)(1),
(2) Date: Nov. 10, 2015

(87) PCT Pub. No.: WO2014/186498
PCT Pub. Date: Nov. 20, 2014

(65) Prior Publication Data
US 2016/0115627 A1    Apr. 28, 2016

Related U.S. Application Data

(60) Provisional application No. 61/824,059, filed on May 16, 2013.

(51) Int. Cl.
| | | |
|---|---|---|
| *B02C 23/00* | (2006.01) | |
| *B02C 23/10* | (2006.01) | |
| *B02C 23/38* | (2006.01) | |
| *D01G 11/04* | (2006.01) | |
| *B07C 5/344* | (2006.01) | |
| *B07C 5/36* | (2006.01) | |

(52) U.S. Cl.
CPC .............. *B02C 23/10* (2013.01); *B02C 23/00* (2013.01); *B02C 23/38* (2013.01); *B07C 5/344* (2013.01); *B07C 5/363* (2013.01); *B07C 5/368* (2013.01); *D01G 11/04* (2013.01); *Y02W 30/667* (2015.05)

(58) Field of Classification Search
CPC ......... B02C 23/00; B02C 23/10; B02C 23/38; B07C 5/363; B07C 5/368; B07C 5/344
USPC .......................................... 241/3, 101.4, 159
See application file for complete search history.

(56) References Cited

U.S. PATENT DOCUMENTS

| | | | | |
|---|---|---|---|---|
| 1,340,225 A | * | 5/1920 | Howard .................... | B26D 9/00 100/907 |
| 3,217,988 A | * | 11/1965 | Lightfoot ................. | B26D 1/38 241/101.4 |
| 3,894,697 A | * | 7/1975 | Lawson .............. | B02C 18/0007 241/159 |
| 4,068,805 A | * | 1/1978 | Oswald ............... | B02C 18/0007 241/159 |

(Continued)

*Primary Examiner* — Faye Francis
(74) *Attorney, Agent, or Firm* — Cahill Law Group LLC

(57) ABSTRACT

The process for removing metal objects such as buttons, zippers and the like from fabric material to permit recovery of the fabric. The fabric is cut or chopped into strips and subsequently cut again to provide smaller pieces of fabric that may or may not contain a metal object secured thereto. The pieces of fabric are applied to a conveyor and exposed to a metal detector that triggers a plurality of pneumatic nozzles to direct a stream of high pressured air to the fabric pieces having metal attached thereto and deject those pieces from the conveyer while the fabric pieces without metal exit the conveyor having a different trajectory than the metal pieces and attached fabric material.

5 Claims, 4 Drawing Sheets

(56) References Cited

U.S. PATENT DOCUMENTS

| | | | | |
|---|---|---|---|---|
| 4,762,280 | A | * | 8/1988 | Prisco ................... B07C 5/02 100/39 |
| 5,031,844 | A | * | 7/1991 | LaRoche ............... D01G 11/00 241/101.2 |
| 5,519,925 | A | | 5/1996 | Ball |
| 5,697,560 | A | * | 12/1997 | Bennett .................. C03B 37/16 241/159 |
| 7,674,994 | B1 | | 3/2010 | Valerio |
| 7,938,347 | B2 | * | 5/2011 | Romanovich ......... B02C 18/142 241/101.4 |
| 7,976,655 | B2 | | 7/2011 | Bacon |
| 2002/0124366 | A1 | | 9/2002 | Hirsch |
| 2011/0049021 | A1 | | 3/2011 | Valerio |
| 2015/0321383 | A1 | * | 11/2015 | Rees ................... B02C 18/0084 241/3 |

* cited by examiner

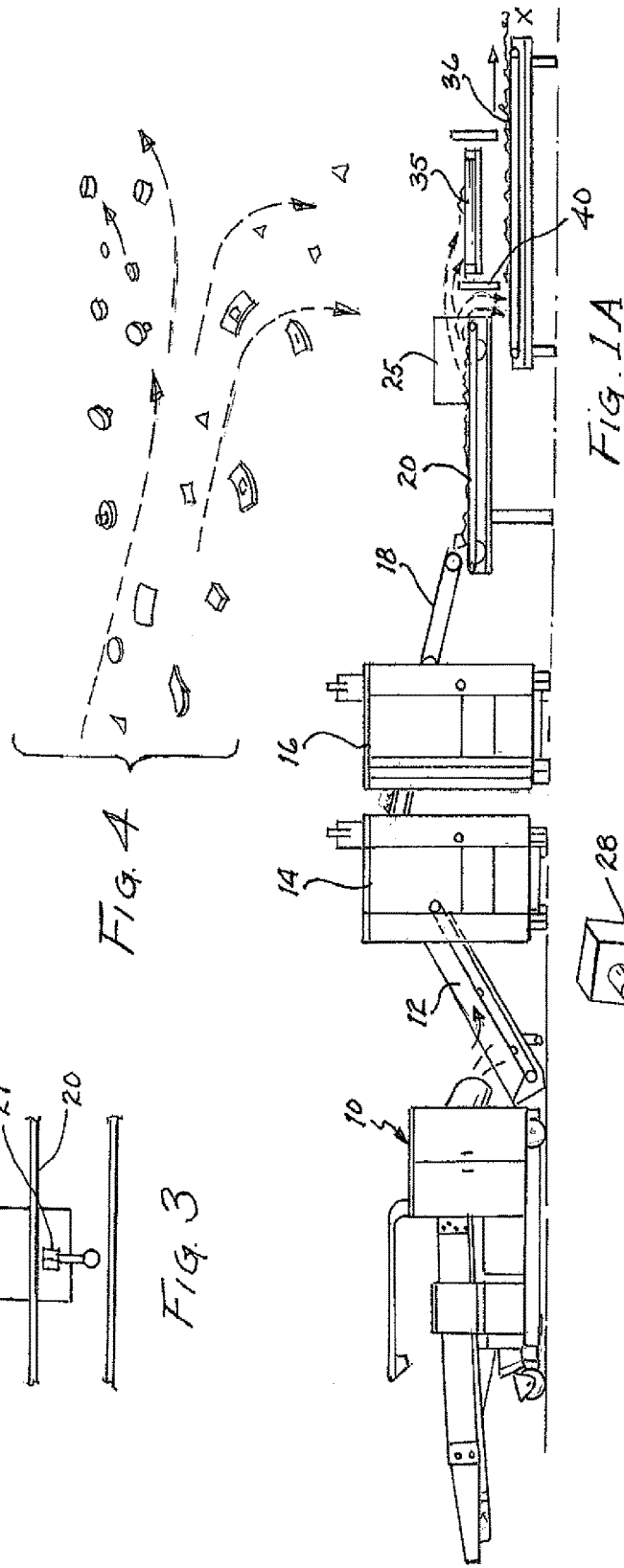

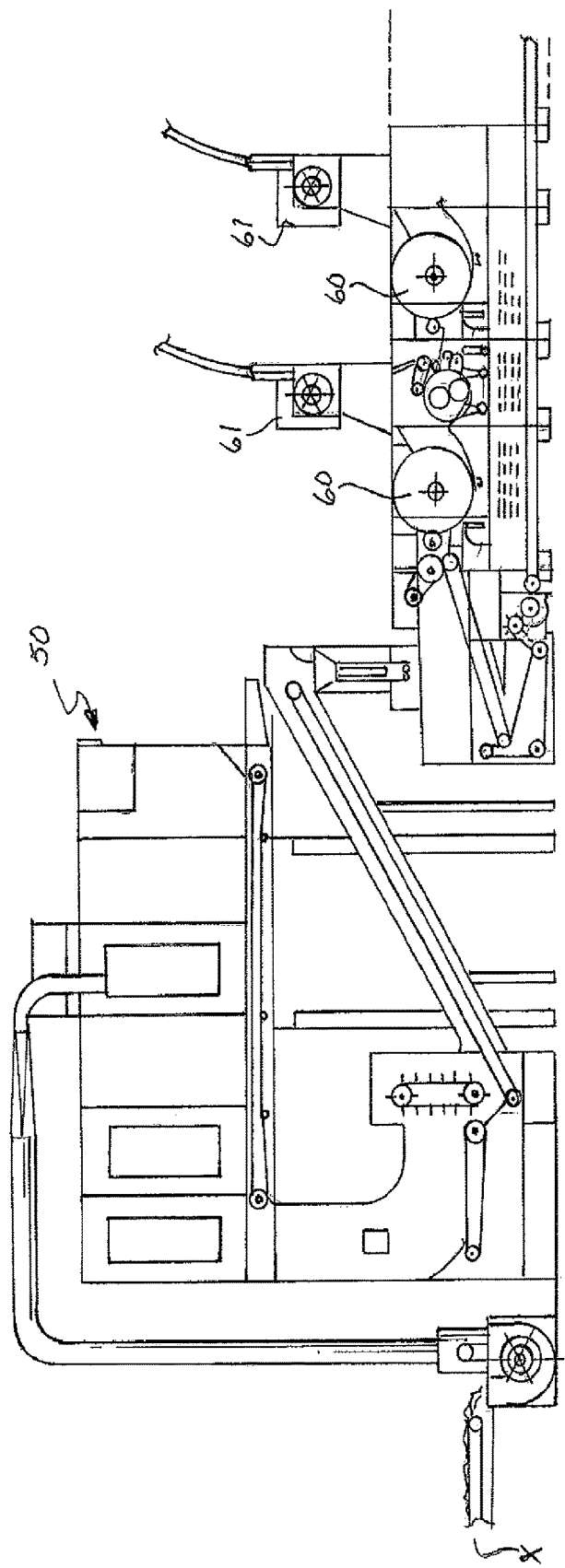

PROCESS FOR RECOVERING SCRAP FIBER

RELATED APPLICATIONS

This application is related to and claims priority to a provisional application entitled "PROCESS FOR RECOVERING SCRAP FIBER" filed May 16, 2013, and assigned Ser. No. 61/824,059.

FIELD OF THE INVENTION

The present invention is directed to a process for recovering fiber from post-consumer or post-industrial textile scraps and is particularly directed to recovering denim fiber as an intermediate product for subsequent utilization in a variety of products.

BACKGROUND OF THE INVENTION

Post-consumer and post-industrial textile scraps frequently present a disposal problem to original manufacturers of textile products such as clothing and the like. Such scrap material is usually baled for disposal or sale to subsequent processors. The textile or fabric material may consist of a variety of textiles such as cotton, and may comprise a combination of textile material. Such bales normally range in size from 100 pounds to 1,200 pounds. Occasionally, such scrap material may be in loose form and simply collected in large plastic bags. The difficulty with reprocessing any such textile scrap materials is the fact that they are contaminated with a variety of metal items secured thereto such as buttons, zippers, and particularly in view of denim clothing, decorative designs implemented on the pockets and elsewhere on jeans and jackets. The metals utilized in such clothing applications may include stainless steel, brass, copper, aluminum, ferrous metals or other types of non-ferrous metals. Attempts to reclaim the fabric from such scrap material can be hazardous since attempts to recover the fabric from such scraps including metal creates excessive wear on processing equipment and includes the danger of fire resulting from sparks when such metal encounters the processing equipment during the attempt to recover the fabric material from the scraps.

SUMMARY OF THE INVENTION

The present invention is directed to a process for removing such metal objects from the scrap fabric material to permit the effective recovery of the fiber for subsequent utilization in other products. The scrap fabric material, such as baled scrap material from post-consumer or post-industrial textile manufacturing is fed from a robot feeder (if the scrap has been baled—otherwise a bulk feeder is utilized) and is provided to a chopper system. The chopper system cuts the material into strips through the utilization of a chopper or guillotine system. The strips are then supplied to a second chopper oriented 90° with respect to the first chopper to cut the strips essentially into squares. The size of the squares are chosen to be approximately 2"×2" (5 cm×5 cm). The 2" square scrap pieces may or may not include a metallic object such as a button.

The material, in the form of fabric squares that may or may not include a metal object is then fed by a discharge conveyor in a single layer spread over a high speed conveyor and is transported to a metal detection system for detecting the presence of scraps having metal attached thereto. The detector system provides an appropriate signal to actuate a pneumatic system including a plurality of air jets. As the scrap material containing the metal object reaches the end of the conveyor system, a jet of air is directed upon the scrap containing the metal object to eject it from the conveyor and propel it to a discard system; the scrap objects without metal attachments are supplied to another conveyor system for further processing.

The non-metal scraps are transported to a mixing or feeding unit for thorough mixings prior to being fed into a plurality of opening cylinders to produce reclaimable fiber material that is collected and sent to a baler or bagger for delivery to subsequent processing systems to thereby create products generated from the scrap fabric.

BRIEF DESCRIPTION OF THE DRAWINGS

The present invention may more readily be described by reference to the accompanying drawings in which:

FIGS. 1A, 1B and 1C present a schematic representation of equipment useful for practicing the process of the present invention.

FIG. 2 is an enlarged schematic representation of a portion of the processing equipment of FIGS. 1A, 1B and 1C.

FIG. 3 is a schematic representation of a portion of the detection equipment incorporated in the process equipment of FIG. 1A.

FIG. 4 is a schematic representation useful for describing the separation and capture of fabric material for subsequent reprocessing and discard of material attached to metallic objects.

DETAILED DESCRIPTION OF THE INVENTION

Figure 1C:
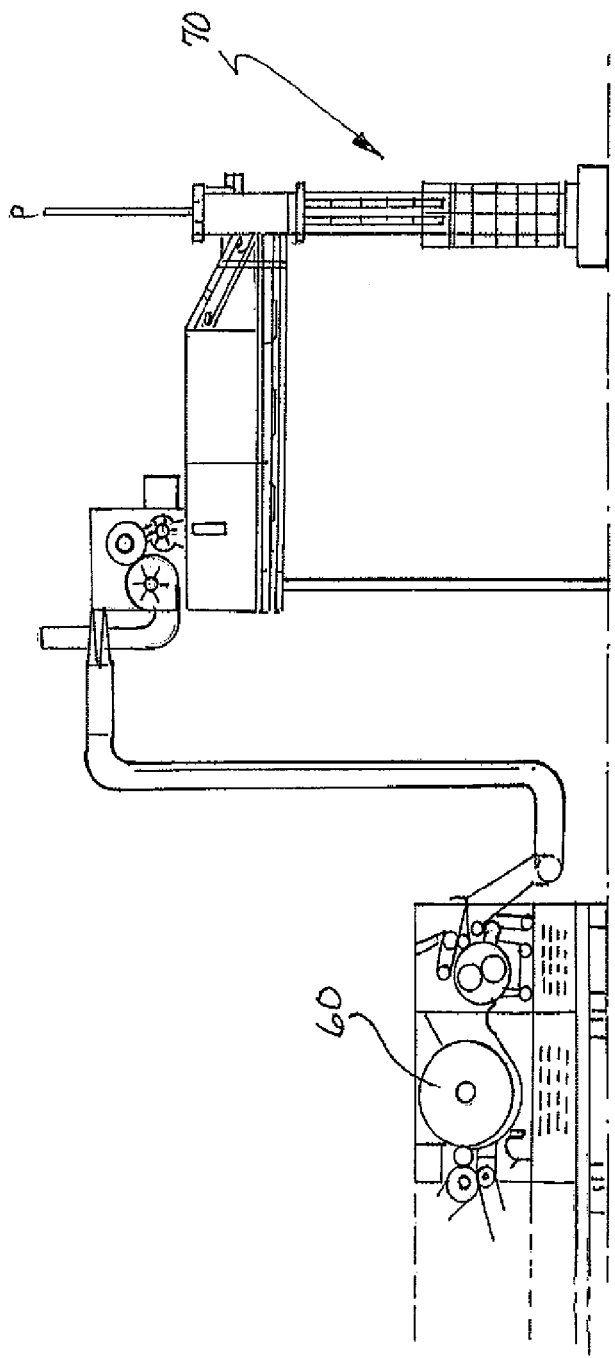

The process of the present invention may more readily be described by reference to suitable equipment for implementing the process.

Referring to the figures, the bulk post-consumer or post-industrial textile scraps may be supplied in baled form and supplied to a Robot unit 10 such as that manufactured by Pierret Inc. that automatically slices off material from the bales at a consistent rate and thus feeds the conveyor 12 to introduce the material into choppers 14 and 16. It is important that the material to be processed in the remaining steps of the process be reduced in size to an appropriate dimension to permit the subsequent separation of those fabric pieces containing metallic objects from those that do not. In the process of the present invention two choppers are utilized, each chopper is a guillotine-type cutter such as that produced by Balkan Corporation and identified as DT62 Guillotine Cutter. A second cutter, identical to the first, is arranged to cut the materials at a 90° angle with respect to the first cutter, the end result of this orthogonal cutting are rectangular fabric pieces, essentially square, that may or may not contain a metallic object such as a button and the like. It has been found that the size of these fabric pieces preferably form a square of approximately 2"×2" (5 cm×5 cm) or less. The choice of the smaller fabric pieces also increases the efficiency with which the process produces useable scrap fiber. The second cutter may be arranged to cut the material at an angle other than 90° that would result in a fabric piece having a parallelogram-shape. However, it is desirable to create smaller fabric pieces and the square configuration is the most desirable and efficient. Those fabric pieces having metallic objects, such as buttons, attached thereto will be discarded; the smaller pieces reduce the amount of fabric that will be discarded with the metallic objects thus recovering a greater percentage of the fabric being processed. The square samples of material are then supplied to a vibratory pan conveyor or chute feed 18 (such conveyor systems may be acquired from the Sicon Company). It is important to convey the scrap textile material so that it is evenly distributed on the conveyor belt; this leveling action by the conveyor allows the textile pieces having metal attached thereto to be separated from non-metal containing pieces of fiber.

The material is then deposited on a fast moving conveyor belt, typically referred to as an accelerator belt 20. The faster the belt travels, the greater the fabric pieces will be dispersed on the belt to facilitate accurate detection and separation of those fabric pieces having metallic objects secured thereto. The width of the accelerator belt will depend on the volume of material that is being processed; the volume could typically be from 100 lbs. per hour to as much as 10,000 lbs. per hour of recycled textile material. All of the equipment in the system for practicing the process should be sized in relation to the amount of material that is being processed. The faster the accelerator belt travels, the greater the dispersion of the material on the belt; it has been found that the velocity of the accelerator belt can be up to 1,000 feet per minute although approximately 700 feet per minute is preferred.

The high speed or accelerator belt transports the fabric pieces through a detection system 25 that detects the existence of, and the position of, any metallic pieces attached to the fabric pieces. The metal detection and separation process may utilize different sorting techniques based upon induction, optical, or even X-ray technology. The latter technology, however, may present complications relating to shielding and work place safety issues. It has been found that inductive principles have best provided for the sorting of the fabric pieces. Referring to FIG. 2, the induction technique employs a plurality of sensors 27 positioned beneath the accelerator belt 20; the sensors 27 transmit electromagnetic waves of a predetermined frequency. The conductivity of metal objects coming within the electromagnetic field inherently distort the field by absorbing electromagnetic energy as a result of the conductivity of the metal. The detectors or sensors 27 detect the variation of the electromagnetic field as a result of such inductive reactance. The detection of this event generates a signal that is provided to a pneumatic system to direct a short blast of compressed air through a selected nozzle 29 as the metallic object approaches or reaches the head pulley 30 to deflect the metal object, and attached fabric, to a destination for subsequent collection and possible further handling. A discard conveyor 35 is shown receiving the fabric pieces having metallic objects attached thereto. The fabric pieces that are metal-free exit the accelerator belt 20 at the head pulley 30 with a different trajectory and are collected on a conveyor 36 (FIG. 1A) for transport to the next step of the process. The different trajectories of the objects exiting the accelerator belt 20 at the head pulley 30 permits a divider 40 to separate the objects in the different trajectories.

Referring to FIG. 3, a schematic representation of the detectors 27 positioned beneath the accelerator belt 20 is shown. In some instances, it may be necessary to incorporate a field generating antenna 28 above the belt whereby detectors may sense field distortions resulting from the passage of a metal object through the field on the conveyor. Some systems for detecting and sorting metal objects do not require this type of transmitting antenna and may instead simply detect distortions in the electric or electromagnetic field transmitted by the sensors caused by the presence of a metal object in the field.

Referring to FIG. 4, is a schematic representation is shown of the separate trajectories of detected metallic objects and fabric pieces that are to be further processed. For simplicity, the schematic diagram of FIG. 4 shows the rejected metal items; however, it should be understood that the metal items will likely have attached pieces of fabric to which the metal is secured when the fabric material was originally formed into clothing.

Referring to FIGS. 1B and 1C, the recovered fabric (without metal) is delivered to a mixing box 50 for blending with previously sorted fabric pieces. The mixing box 50 may, for example, be a Feeding Unit manufactured by Balkan Corporation and designated as their DT-70-Feeding Unit.

The mixed fabric pieces are then conveyed to a plurality of opening cylinders 60 to "open" the fabric pieces and convert those pieces into original fiber form. The opening equipment may, for example, be obtained from Balkan Corporation and designated DT-30-Mege Pulling. These units incorporate rotating opening cylinders and convert the fabric to non-woven fibers. The number of opening devices or stages and the number of pins provided in the respective cylinders of the corresponding opening devices may be chosen depending on the fabric and the parameters of the desired end product and how the fabric it is to be fiberized.

Each of the opening cylinder units will contain its own air condenser and dust removal fan system 61 to deliver dust laden air to an appropriate collection system such as a dust sock or bag house. The embodiment shown in the drawings incorporates several opening cylinders, each having its own dust removal system; it is possible for the dust removal systems to be combined by a single system for the collection of dust laden air from all of the opening devices.

The opened fiber is pneumatically collected and provided to a baler 70; dust removal apparatus is included in this final step of the process where the opened fiber are baled. A suitable baling system may be obtained from Balkin Corporation and referred to as a Bale Press.

Figure 5:
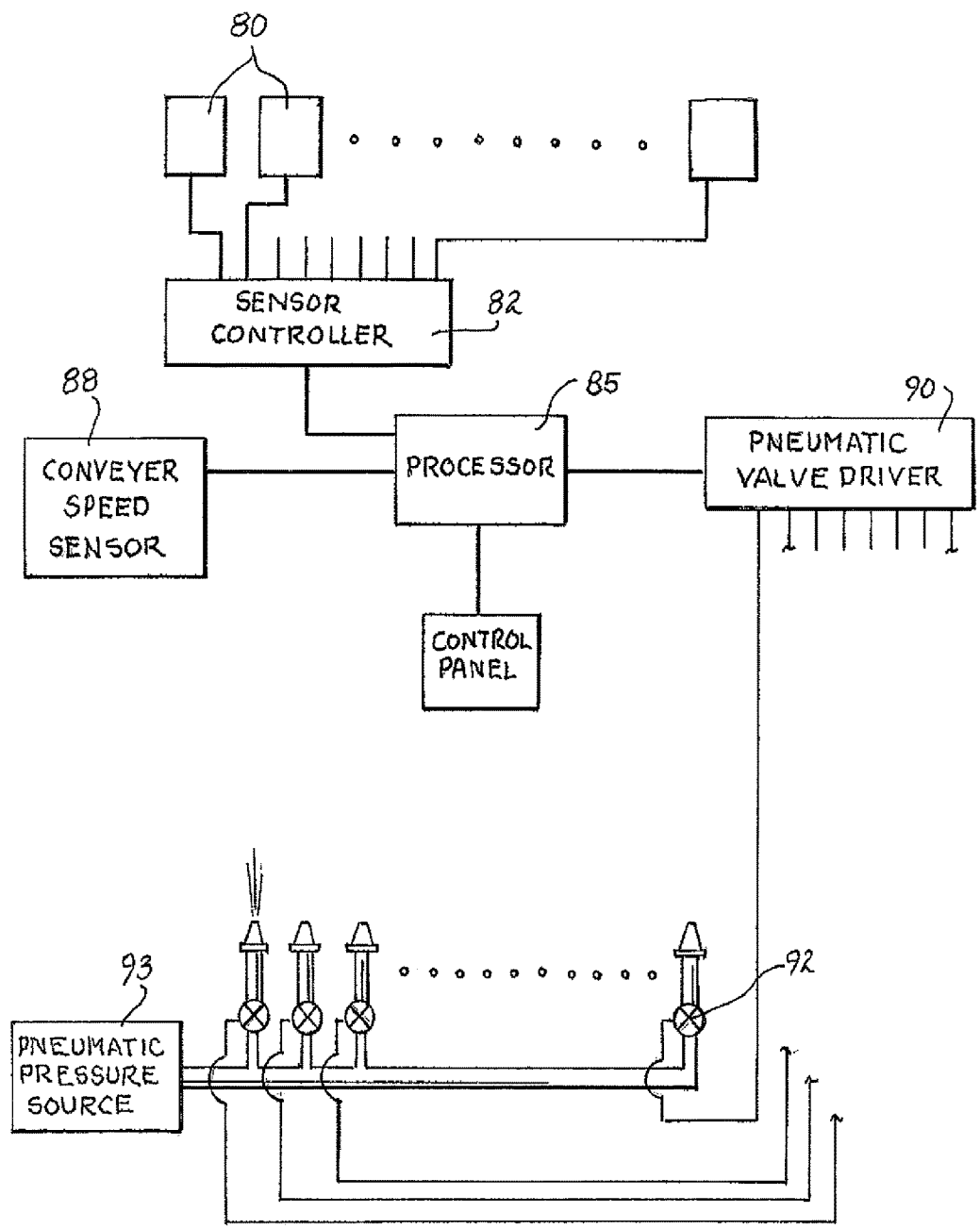
FIG. 5 is a schematic block diagram useful for describing a sorting/separating technique employed in the process of the present invention.

Referring to FIG. 5, a schematic block diagram useful for describing a sorting/separating technique employed in the process of the present invention is shown. A plurality of sensors 80 are spaced across the width of the accelerator belt. The sensors continuously detect the presence of any electrically conductive objects being conveyed by the belt. The detection of a metallic object results in a signal from the individual sensor to a sensor controller 82. The controller provides information corresponding to the detection of a metal object by one or more of the sensors and provides information concerning the detection, including which sensor (the location transversely of the belt) to a central processor 85. A conveyor speed sensor 88 also provides conveyor belt speed information to the processor. Thus, having received a signal from the sensor controller that a sensor has detected a metal object and having received conveyor speed information, the processor can provide a triggering signal to a pneumatic valve driver 90 to open the corresponding valve 92 and admit pneumatic pressure from the pneumatic pressure source 93 to the appropriate air nozzle 94. The opening of the corresponding valve causes the targeted blast of air to contact the fabric piece having a metal object connected thereto and cause the metal object, and attached fabric piece, to exit the belt at the head pulley in a trajectory to be deposited on a waste conveyor and subsequently transported for disposal or further handling. Fabric pieces not attached to metallic objects thus travel the accelerator belt without impingement by an air blast and are conveyed over the head pulley onto a conveyor system for transport to the mixing box and subsequent handling in the present process The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. A method for removing metal objects attached to fabric pieces from scrap textile material comprising:
    (a) cutting said scrap textile material into strips of fabric material;
    (b) cutting said strips of fabric material into cut fabric pieces;
    (c) providing an accelerator belt for receiving said cut fabric pieces;
    (d) depositing said cut fabric pieces on the accelerator belt to disperse the cut fabric pieces on the accelerator belt;
    (e) transporting said cut fabric pieces on said accelerator belt past a plurality of metal detectors;
    (f) detecting metal objects attached to said cut fabric pieces on said accelerator belt; and
    (g) directing a jet of air onto said cut fabric pieces having metal objects attached thereto to eject them from the accelerator belt and transport them to a discard system.

2. The method for removing metal objects attached to fabric pieces from scrap textile material of claim 1 wherein said fabric pieces are square.

3. The method for removing metal objects attached to fabric pieces from scrap textile material of claim 1 wherein said fabric pieces are squares measuring 2"×2" or less.

4. The method for removing metal objects attached to fabric pieces from scrap textile material of claim 1 wherein:
    (a) said scrap textile material is cut into strips of fabric by a guillotine cutter;
    (b) said strips of fabric material are supplied to a second guillotine cutter; and
    (c) said strips of fabric material are cut in said second cutter at an approximate angle of 90° with respect to the first cutter to form square pieces of fabric material.

5. The method for removing metal objects attached to fabric pieces from scrap textile material according to claim 4 wherein said squares of fabric material measure 2"×2" or less.

* * * * *